(12) United States Patent
Natsume et al.

(10) Patent No.: US 11,480,447 B2
(45) Date of Patent: Oct. 25, 2022

(54) FADER DEVICE

(71) Applicant: Yamaha Corporation, Hamamatsu (JP)

(72) Inventors: Yoshihiro Natsume, Hamamatsu (JP); Yoshihiro Suzuki, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/159,985

(22) Filed: Jan. 27, 2021

(65) Prior Publication Data

US 2021/0239495 A1  Aug. 5, 2021

(30) Foreign Application Priority Data

Feb. 4, 2020  (JP) .............................. JP2020-017348

(51) Int. Cl.
| | | |
|---|---|---|
| *G01D 5/24* | (2006.01) | |
| *G01D 5/241* | (2006.01) | |
| *H01R 41/00* | (2006.01) | |

(52) U.S. Cl.
CPC ............. *G01D 5/24* (2013.01); *G01D 5/2417* (2013.01); *H01R 41/00* (2013.01)

(58) Field of Classification Search
CPC .. G01D 5/00; G01D 5/12; G01D 5/14; G01D 5/24; G01D 5/2403; G01D 5/2405; G01D 5/241; G01D 5/2415; H01R 41/00; H01H 15/00; H01H 15/02; H01H 15/06; H01H 15/10; H05F 1/00
USPC ....... 324/600, 649, 658, 660, 661, 662, 663, 324/671, 686; 345/173, 174
See application file for complete search history.

(56) References Cited

U.S. PATENT DOCUMENTS

| | | | | |
|---|---|---|---|---|
| 7,123,027 B2 * | 10/2006 | Tola | ........................ | H03M 1/26 324/662 |
| 7,554,345 B2 * | 6/2009 | Vokey | ..................... | G01M 3/16 324/718 |
| 7,583,086 B2 * | 9/2009 | Yasuda | .................. | G01R 29/12 324/458 |
| 7,656,168 B2 * | 2/2010 | Mahowald | ............ | G06F 3/0418 324/660 |
| 7,830,158 B2 * | 11/2010 | Geaghan | ............... | G06F 3/0416 324/684 |
| 8,085,254 B2 * | 12/2011 | Kato | ....................... | H01C 10/30 345/184 |
| 8,089,288 B1 * | 1/2012 | Maharita | ............... | G06F 3/0445 324/678 |

FOREIGN PATENT DOCUMENTS

JP   4301311 B2   7/2009

* cited by examiner

*Primary Examiner* — Hoai-An D. Nguyen
(74) *Attorney, Agent, or Firm* — Crowell & Moring LLP

(57) ABSTRACT

A fader device includes a conductive shaft, a conductive moving body, and a conductive portion. The conductive moving body is movable in the longitudinal direction of the shaft and includes a gap between it and the conductive shaft. The conductive portion brings the shaft and the moving body into electrical continuity. A signal generation portion generates a touch sense signal. A detection portion detects contact with the conductive moving body based on a signal output according to a capacitance generated between the conductive shaft and the conductive moving body in response to the touch sense signal.

3 Claims, 4 Drawing Sheets

FADER DEVICE

CROSS REFERENCE TO RELATED APPLICATION

Priority is claimed on Japanese Patent Application No. 2020-17348, filed Feb. 4, 2020, the content of which is incorporated herein by reference.

BACKGROUND OF THE INVENTION

Field of the Invention

The present subject matter relates to a fader device.

Description of Related Art

Japanese Patent No. 43013111 discloses a fader device (slide operation device) used for a mixing console or the like. This fader device is provided with a shaft (guide bar) that is conductive and a moving body that is conductive and that is provided to be movable in the longitudinal direction of the shaft. In this fader device, a gap is formed between the shaft and the moving body by providing an insulating member between the shaft and the moving body.

SUMMARY OF THE INVENTION

In a fader device, if there is a gap between the conductive shaft and the moving body, a discharge (spark) due to static electricity or the like may occur in the gap between the shaft and the moving body. When such a discharge occurs, an electric field or a magnetic field is generated around the shaft and the moving body. The generated electric field or magnetic field may affect the electrical circuits of the fader device and various devices including the fader device. In particular, since it is difficult to release the generated magnetic field, the magnetic field tends to affect the electric circuit. Therefore, it is required to suppress the generation of electric discharge in the gap between the shaft and the moving body.

The present subject matter has been made in view of the above circumstances, and an object of the present subject matter is to provide a fader device capable of suppressing the generation of electric discharge in the gap between the shaft and the moving body.

The fader device according to one aspect of the present subject matter is provided with a conductive shaft, a conductive moving body disposed through a gap with respect to the shaft and movable in the longitudinal direction of the shaft, and a conductive portion having conductivity that brings the shaft and the moving body into electrical continuity.

DETAILED DESCRIPTION OF THE INVENTION

Hereinafter, an embodiment of the present subject matter will be described with reference to FIGS. 1 to 4.

Figure 1:
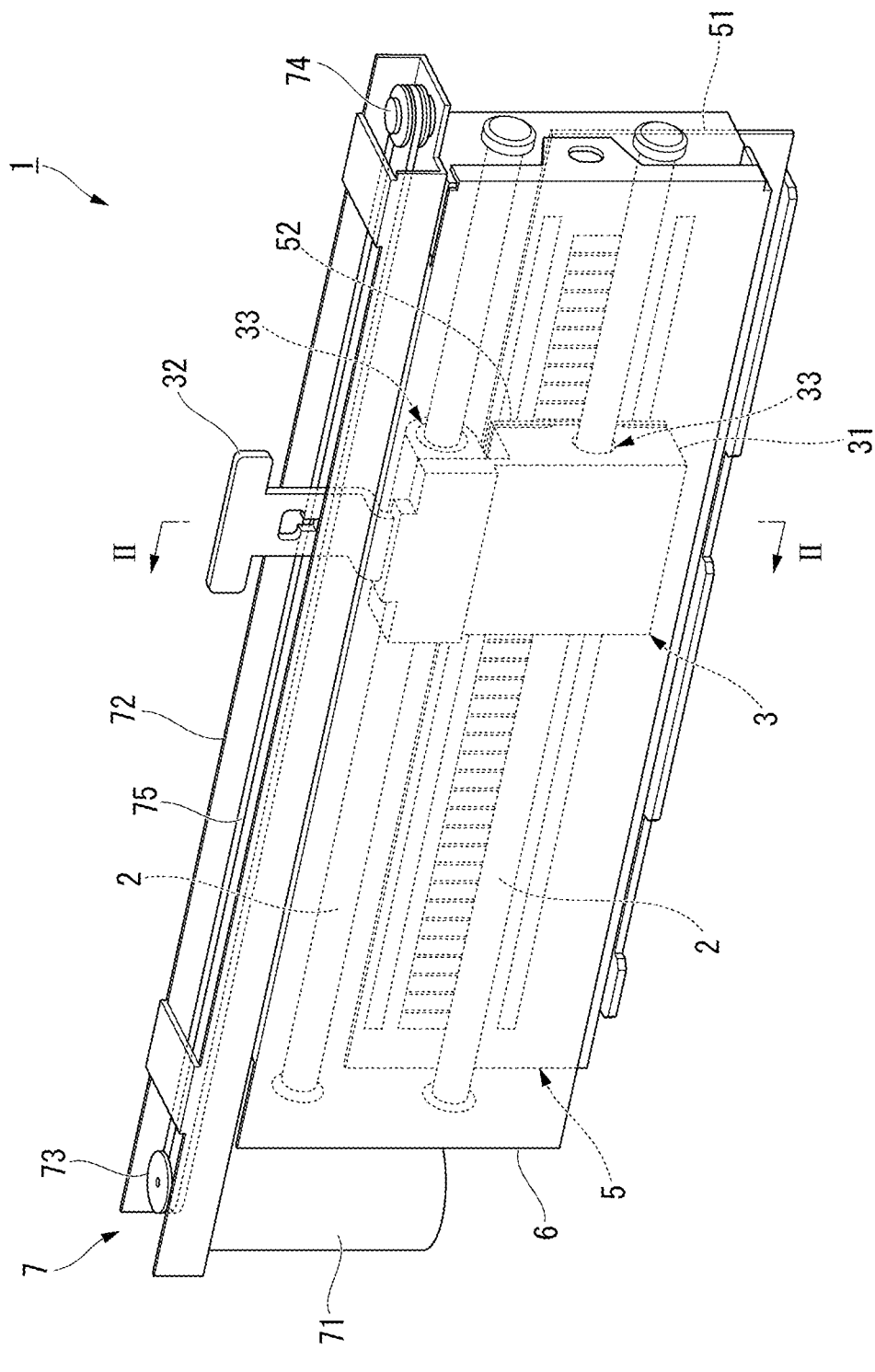
FIG. 1 is a perspective view showing a fader device according to an embodiment of the present subject matter.
Figure 2:
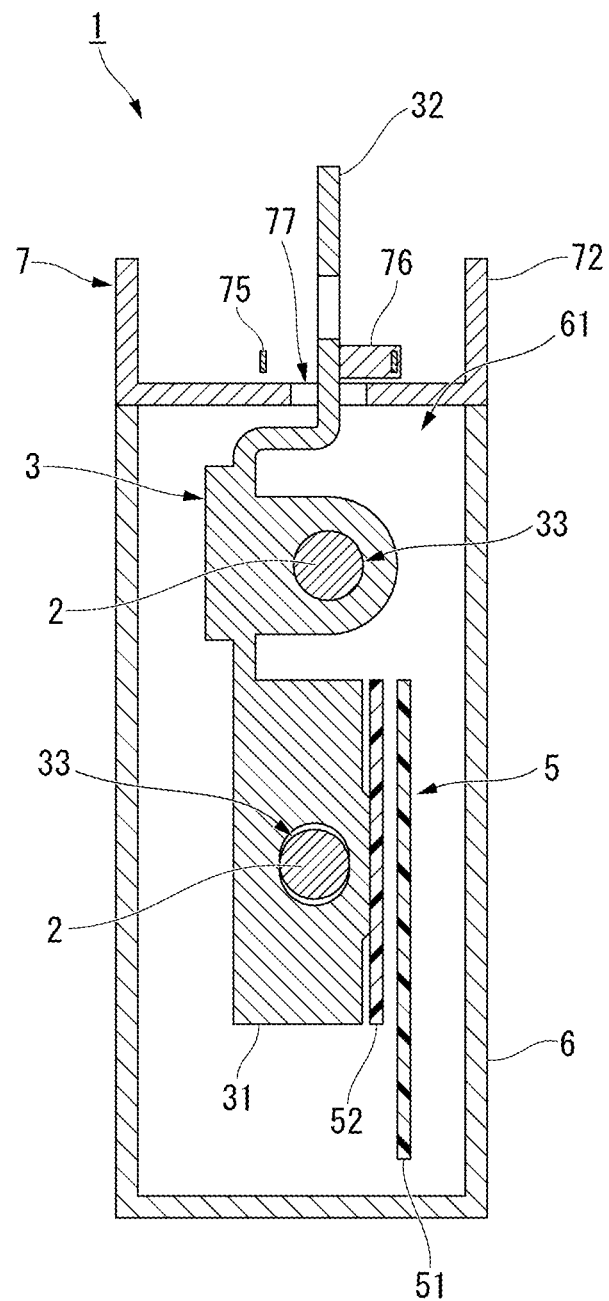
FIG. 2 is a cross-sectional view taken along the line II-II of FIG. 1.
Figure 3:
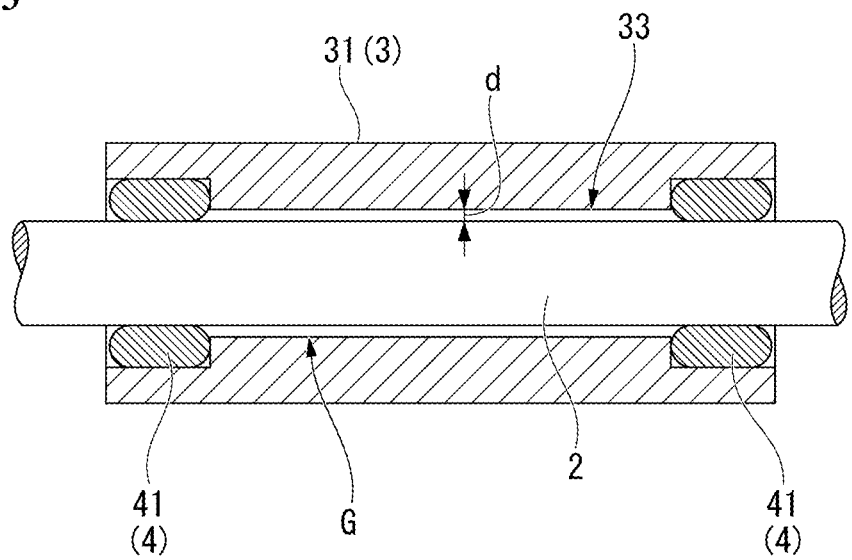
FIG. 3 is a cross-sectional view showing a part of the fader device according to the embodiment.

As shown in FIGS. 1 to 3, a fader device 1 according to the present embodiment is provided with a shaft 2, a moving body 3, and a conductive portion 4.

The shaft 2 is formed in a rod shape having conductivity. The fader device 1 of the present embodiment is provided with a plurality of shafts 2 (two in the illustrated example). The plurality of shafts 2 are arranged so as to be parallel to each other in a state of being mutually spaced apart.

The moving body 3 is conductive and includes a gap G with respect to the shaft 2. Specifically, the shaft 2 is spaced or separated from the moving body 3 by the gap G. Further, the moving body 3 is movable in the longitudinal direction of the shaft 2. The moving body 3 of the present embodiment has a main body portion 31 and an operation portion 32 extending from the main body portion 31.

A through hole 33 for inserting the shaft 2 is formed in the main body portion 31. The main body portion 31 of the present embodiment has a plurality of through holes 33 (two in the illustrated example). The plurality of through holes 33 are parallel to each other. The plurality of shafts 2 described above are individually inserted into the plurality of through holes 33. Thereby, the moving body 3 can move with respect to the shaft 2 in the longitudinal direction thereof. As shown in FIG. 3, the gap G between the shaft 2 and the moving body 3 is formed between the outer peripheral surface of the shaft 2 and the inner peripheral surface of the through hole 33 of the main body portion 31.

The operation portion 32 shown in FIGS. 1 and 2 is a portion that the operator touches with a finger in order to move the moving body 3 with the finger of the operator. The operation portion 32 extends in a direction orthogonal to the longitudinal direction of the shaft 2 with respect to the main body portion 31.

The conductive portion 4 shown in FIG. 3 is conductive, and brings the shaft 2 and the moving body 3 into electrical continuity. The conductive portion 4 is in constant contact with the shaft 2 and the moving body 3. As a result, the shaft 2 and the moving body 3 are always electrically continuous.

The conductive portion 4 is interposed between the shaft 2 and the moving body 3. Specifically, the conductive portion 4 is interposed between the outer peripheral surface of the shaft 2 and the inner peripheral surface of the through hole 33 of the moving body 3. As a result, the gap G is formed between the outer peripheral surface of the shaft 2 and the inner peripheral surface of the through hole 33.

The conductive portion 4 in the present embodiment is a ring-shaped conductive bush 41 provided on the moving body 3. More specifically, the conductive bush 41 is attached to the inner peripheral surface of the through hole 33. A plurality (two in the illustrated example) of the conductive bushes 41 are arranged spaced apart in the longitudinal direction of the through hole 33 (shaft 2). In FIG. 3, two conductive bushes 41 are provided at both ends of the through hole 33 in the longitudinal direction, but the present subject matter is not limited thereto. The plurality of conductive bushes 41 can keep the distance d of the gap G between the shaft 2 and the moving body 3 constant.

By the shaft 2 and the moving body 3, which have conductivity, being disposed through the gap G, the shaft 2 and the moving body 3 are capacitively coupled. The capacitance between the shaft 2 and the moving body 3 is determined by the dielectric constant of air in the gap G between the shaft 2 and the moving body 3, the dielectric constant of the conductive bush 41 (conductive portion 4) interposed between the shaft 2 and the moving body 3, the distance d between the shaft 2 and the moving body 3, and the like.

As shown in FIGS. 1 and 2, the fader device 1 of the present embodiment is further provided with a position detection portion 5, a box body 6, and a drive portion 7.

The position detection portion 5 detects the position of the moving body 3 in the longitudinal direction of the shaft 2. The position detection portion 5 has a sensor substrate 51 fixed to the shaft 2 and a header substrate 52 fixed to the moving body 3. The sensor substrate 51 is fixed to the shaft 2 via the box body 6. The sensor substrate 51 and the header substrate 52 are disposed spaced apart in a direction orthogonal to the longitudinal direction of the shaft 2. When the header substrate 52 moves together with the moving body 3 in the longitudinal direction of the shaft 2, the sensor substrate 51 detects the position of the header substrate 52 (moving body 3) in the longitudinal direction of the shaft 2. With regard to the position detection of the header substrate 52, for example, capacitive coupling between the sensor substrate 51 and the header substrate 52 may be used.

The box body 6 accommodates the shaft 2 and the moving body 3. Both ends of the shaft 2 in the longitudinal direction are supported by wall portions of the box body 6. The box body 6 is formed with an opening 61 extending in the longitudinal direction of the shaft 2. The operation portion 32 of the moving body 3 projects to the outside of the box body 6 through the opening 61 of the box body 6. The box body 6 for example is conductive and may be connected to ground.

The drive portion 7 moves the moving body 3 by the driving force of a motor 71. In addition to the motor 71, the drive portion 7 is provided with a frame portion 72, a drive pulley 73, a driven pulley 74, an endless belt 75, and a mounting portion 76.

The frame portion 72 is formed in a long shape extending in the longitudinal direction of the shaft 2 and is provided so as to close the opening 61 of the box body 6. The frame portion 72 is formed with a slit 77 extending in the longitudinal direction of the shaft 2 and passing through the operation portion 32 of the moving body 3. The motor 71, the drive pulley 73, and the driven pulley 74 are attached to the frame portion 72. The motor 71 and the drive pulley 73 are arranged at the first end portion of the frame portion 72 in the longitudinal direction. The drive pulley 73 is attached to a rotating shaft (not shown) of the motor 71. The driven pulley 74 is arranged at the second end portion of the frame portion 72 in the longitudinal direction. The endless belt 75 is wound around the drive pulley 73 and the driven pulley 74. The mounting portion 76 is fixed to a part of the endless belt 75 in the circumferential direction. The operation portion 32 of the moving body 3 is attached to the mounting portion 76.

In the drive portion 7, the endless belt 75 moves between the drive pulley 73 and the driven pulley 74 by the drive pulley 73 rotating by the driving force of the motor 71. As a result, the moving body 3 attached to the endless belt 75 can move in the longitudinal direction of the shaft 2.

Figure 4:
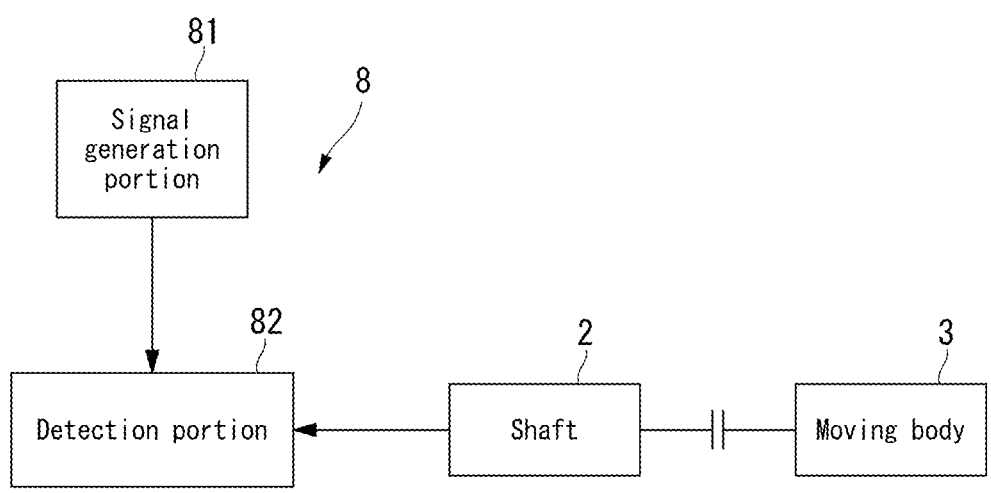
FIG. 4 is a block diagram showing a touch sensor used in the fader device according to the embodiment of the present subject matter.

Further, as shown in FIG. 4, the fader device 1 of the present embodiment is provided with a touch sensor 8 that detects the presence of contact of the operator's finger on the moving body 3 (operation portion 32). The touch sensor 8 is provided with a signal generation portion 81 and a detection portion 82. The signal generation portion 81 and detection portion 82 may be implemented in and used with a variety of electronic component and network architectures. In an example embodiment, one or both of the signal generation portion 81 and detection portion 82 may be electronic circuits. A computing device suitable for implementing embodiments of the presently disclosed subject matter may also be used to implement one or both of signal generation portion 81 and detection portion 82. The computing device may be, for example, a desktop or laptop computer, or a mobile computing device such as a smart phone, tablet, or the like. The computing device may include a bus which interconnects major components of the computer, such as a central processor, a memory such as Random Access Memory (RAM), Read Only Memory (ROM), flash RAM, or the like, a user display such as a display screen, a user input interface, which may include one or more controllers and associated user input devices such as a keyboard, mouse, touch screen, and the like, a fixed storage such as a hard drive, flash storage, and the like, a removable media component operative to control and receive an optical disk, flash drive, and the like, and a network interface operable to communicate with one or more remote devices via a suitable network connection. The bus allows data communication between the central processor and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer are generally stored on and accessed via a computer readable medium, such as a hard disk drive (e.g., fixed storage), an optical drive, floppy disk, or other storage medium. The fixed storage may be integral with the computer or may be separate and accessed through other interfaces. The network interface may provide a direct connection to a remote server via a wired or wireless connection. The network interface may provide such connection using any suitable technique and protocol as will be readily understood by one of skill in the art, including digital cellular telephone, WiFi, Bluetooth®, near-field, and the like. For example, the network interface may allow the computer to communicate with other computers via one or more local, wide-area, or other communication networks, as described in further detail below. More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The signal generation portion 81 generates a touch sense signal. The touch sense signal is, for example, a pulse signal generated at a predetermined time interval. The signal generation portion 81 outputs the touch sense signal to the detection portion 82. The detection portion 82 detects the presence of contact with the moving body 3 based on a signal output according to the capacitance generated between the shaft 2 and the moving body 3 in response to the touch sense signal. When a finger of the operator touches the moving body 3, the moving body 3 is connected to ground through the operator (human body), so that, in contrast to the state where the operator is not touching the moving body 3, the capacitance generated between the shaft 2 and the moving body 3 changes. Correspondingly, a change also occurs in the signal that is output in response to the touch sense signal. Thereby, the detection portion 82 can detect the presence of contact by the operator with the moving body 3.

By causing the moving body 3 to move by an operator or the motor 71, the fader device 1 of the present embodiment can be used as a device for adjusting various parameters such as volume and tone and visualizing the adjustment of various parameters.

As described above, in the fader device 1 of the present embodiment, the shaft 2 and the moving body 3, which are mutually disposed through the gap G, are brought into electrical continuity by the conductive portion 4. As a result, even if a potential difference arises between the shaft 2 and the moving body 3 due to an electric discharge as a result of static electricity or the like between the moving body and the operator who touches the moving body, it is possible to suppress the generation of electric discharge in the gap G between the shaft 2 and the moving body 3.

Further, in the fader device 1 of the present embodiment, the conductive portion 4 is interposed between the shaft 2 and the moving body 3. Therefore, it is possible to form the gap G between the moving body 3 and the shaft 2 with the conductive portion 4. This eliminates the need to separately prepare a member for forming the gap G between the moving body 3 and the shaft 2. Accordingly, the number of component parts of the fader device 1 can be reduced, and the configuration of the fader device 1 can be simplified.

Further, in the fader device 1 of the present embodiment, the conductive portion 4 is the conductive bush 41 provided on the moving body 3. The conductive bush 41 comes into contact with each of the entire circumferential direction of the inner peripheral surface of the through hole 33 of the moving body 3 and the entire circumferential direction of the outer peripheral surface of the shaft 2. Therefore, the contact area between the shaft 2 and the conductive portion 4 and the contact area between the moving body 3 and the conductive portion 4 can be increased to more reliably guarantee the continuity between the shaft 2 and the moving body 3. Accordingly, it is possible to further suppress the generation of electric discharge in the gap G between the shaft 2 and the moving body 3.

Further, in the fader device 1 of the present embodiment, the detection portion 82 detects the presence of contact with the moving body 3 (operation portion 32) on the basis of the signal output according to the capacitance generated between the shaft 2 and the moving body 3 in response to the touch sense signal generated by the signal generation portion 81. Thereby, it is possible to detect whether or not the operator is touching the moving body 3 by using the gap G between the shaft 2 and the moving body 3.

While preferred embodiments of the present subject matter have been described and illustrated above, it should be understood that these are exemplary of the present subject matter and are not to be considered as limiting. Additions, omissions, substitutions, and other modifications can be made without departing from the spirit or scope of the present subject matter. Accordingly, the present subject matter is not to be considered as being limited by the foregoing description, and is only limited by the scope of the appended claims.

Figure 5:
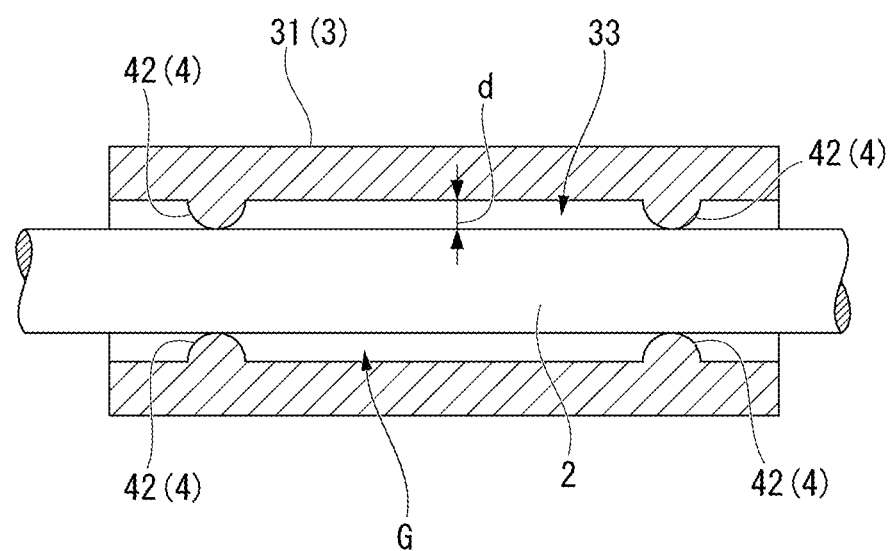
FIG. 5 is a cross-sectional view showing a modification of the fader device according to the embodiment.

In the fader device described above, the conductive portion 4 interposed between the shaft 2 and the moving body 3 is not limited to the conductive bush 41. For example, as shown in FIG. 5, instead of the conductive bush 41, a protrusion 42 formed on the moving body 3 and protruding from the inner peripheral surface of the through hole 33 of the moving body 3 toward the outer peripheral surface of the shaft 2 may be provided. The protrusion 42 formed on the moving body 3 may for example be formed in an arc shape or a ring shape extending in the circumferential direction of the through hole 33, or may be formed in a linear shape extending in the longitudinal direction of the shaft 2. Further, a plurality of the protrusions 42 may be arranged at intervals in the circumferential direction of the through hole 33 or the longitudinal direction of the shaft 2.

The protrusion 42 may be formed on the shaft 2, for example, and may protrude from the outer peripheral surface of the shaft 2 toward the inner peripheral surface of the through hole 33 of the moving body 3. In this case, the protrusion 42 may be formed in a linear shape extending in the longitudinal direction of the shaft 2, or may be arranged in a plurality at intervals in the circumferential direction or the longitudinal direction of the shaft 2.

Figure 6:
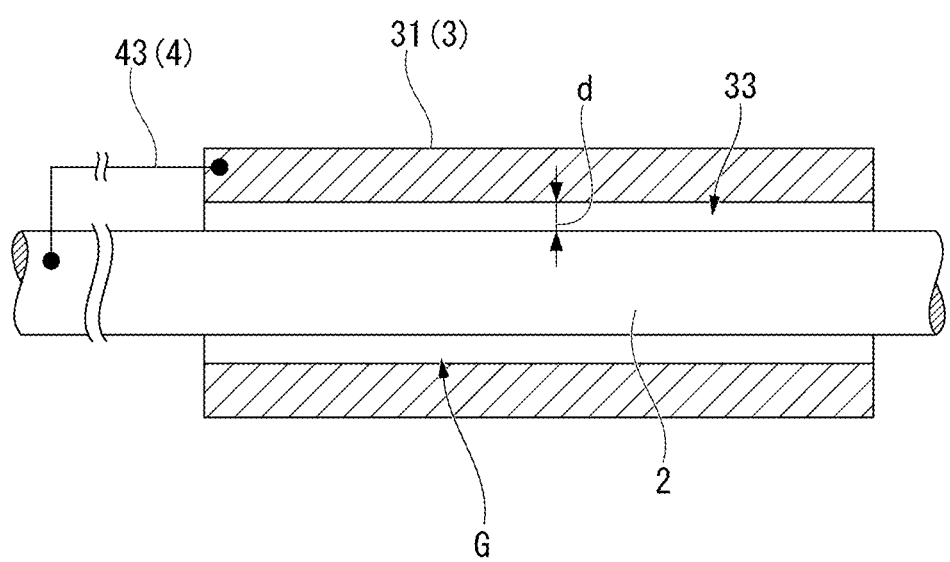
FIG. 6 is a cross-sectional view showing another modification of the fader device according to the embodiment.

In the fader device described above, the conductive portion 4 that brings the shaft 2 and the moving body 3 into electrical continuity may be an electric wiring 43 that connects the shaft 2 and the moving body 3, for example, as shown in FIG. 6. The first end of the electric wiring 43 is fixed to the end of the shaft 2 in the longitudinal direction, and the second end of the electric wiring 43 is fixed to the moving body 3. The electric wiring 43 may have sufficient length and flexibility so that the moving body 3 can freely move with respect to the shaft 2 in the longitudinal direction thereof. In the configuration shown in FIG. 6, for example, the gap G may be formed between the shaft 2 and the moving body 3 by interposing an insulator such as an insulating bush between the shaft 2 and the moving body 3.

In the fader device described above, for example, the outer peripheral surface of the shaft 2 facing the moving body 3 may be constituted with an insulator having an electrically insulating property. The insulator may constitute, for example, the entire shaft 2, or may be, for example, an insulating layer that covers the outer peripheral surface of the conductive shaft body. In such a configuration, even if the shaft 2 and the moving body 3 are disposed with the gap G interposed therebetween, the shaft 2 and the moving body 3 are electrically insulated by the insulator. Thereby, even if the fader device is not provided with the conductive portion 4, it is possible to suppress or prevent the generation of electric discharge in the gap G between the shaft 2 and the moving body 3.

In the fader device described above, for example, the shaft 2 and the moving body 3 having conductivity are disposed through the gap G, and the distance d between the shaft 2 and the moving body 3 may be 0.4 mm or more and 1.0 mm or less. Due to the distance d between the shaft 2 and the moving body 3 being 0.4 mm or more, it is possible to suppress or prevent the generation of electric discharge in the gap G between the shaft 2 and the moving body 3 even if the fader device is not provided with the conductive portion 4. Further, when the distance d between the shaft 2 and the moving body 3 is 1.0 mm or less, the shaft 2 and the moving body 3 can be capacitively coupled. Thereby, the gap G between the shaft 2 and the moving body 3 can be used for the touch sensor 8 similar to the above embodiment to detect whether or not the operator is touching the moving body 3.

In the fader device described above, for example, the shaft 2 may be directly connected to ground (for example, the box body 6). In such a configuration, as compared with the case where the shaft 2 is connected to ground via electric wiring having electrical resistance, it is possible to suppress or prevent the generation of electric discharge in the gap G between the shaft 2 and the moving body 3.

In the fader device described above, the moving body 3 need only be movable at least in the longitudinal direction with respect to the shaft 2. Therefore, instead of the through hole 33 being formed, for example, a groove into which at least a part of the shaft 2 enters may be formed in the moving body 3. In this case, a gap need only be formed between the inner surface of the groove of the moving body 3 and the shaft 2.

According to the present subject matter, it is possible to suppress the generation of electric discharge in the gap between the shaft and the moving body.

What is claimed is:

1. A fader device comprising:
   a conductive shaft;
   a conductive moving body having a through-hole for inserting the conductive shaft and movable in a longitudinal direction of the conductive shaft by slidably engaging the through-hole with the conductive shaft so that a gap is disposed between the conductive shaft; and
   a conductive bush provided on the conductive moving body and interposed between the conductive shaft and the conductive moving body so as to bring the conductive shaft and the conductive moving body into electrical continuity.

2. The fader device according to claim 1, further comprising:
   a signal generation portion to generate a touch sense signal; and
   a detection portion to detect contact with the conductive moving body based on a signal output according to a capacitance generated between the conductive shaft and the conductive moving body in response to the touch sense signal.

3. The fader device according to claim 2, wherein
   at least one of the signal generation portion and the detection portion is implemented by a processor including a central processing unit (CPU) executing a program stored in a storage unit, or using hard ware including a large scale integration (LSI), an application specific integrated circuit (ASIC) or a field-programmable gate array (FPGA).

* * * * *